T. C. PROUTY.
DRIVING MECHANISM.
APPLICATION FILED FEB. 16, 1918.

1,334,713.

Patented Mar. 23, 1920.
2 SHEETS—SHEET 1.

Witness:
C. Burnap

Inventor:
Theodore C. Prouty
By Sheridan, Sheridan & Smith, Attys

T. C. PROUTY.
DRIVING MECHANISM.
APPLICATION FILED FEB. 16, 1918.
1,334,713.
Patented Mar. 23, 1920.
2 SHEETS—SHEET 2.
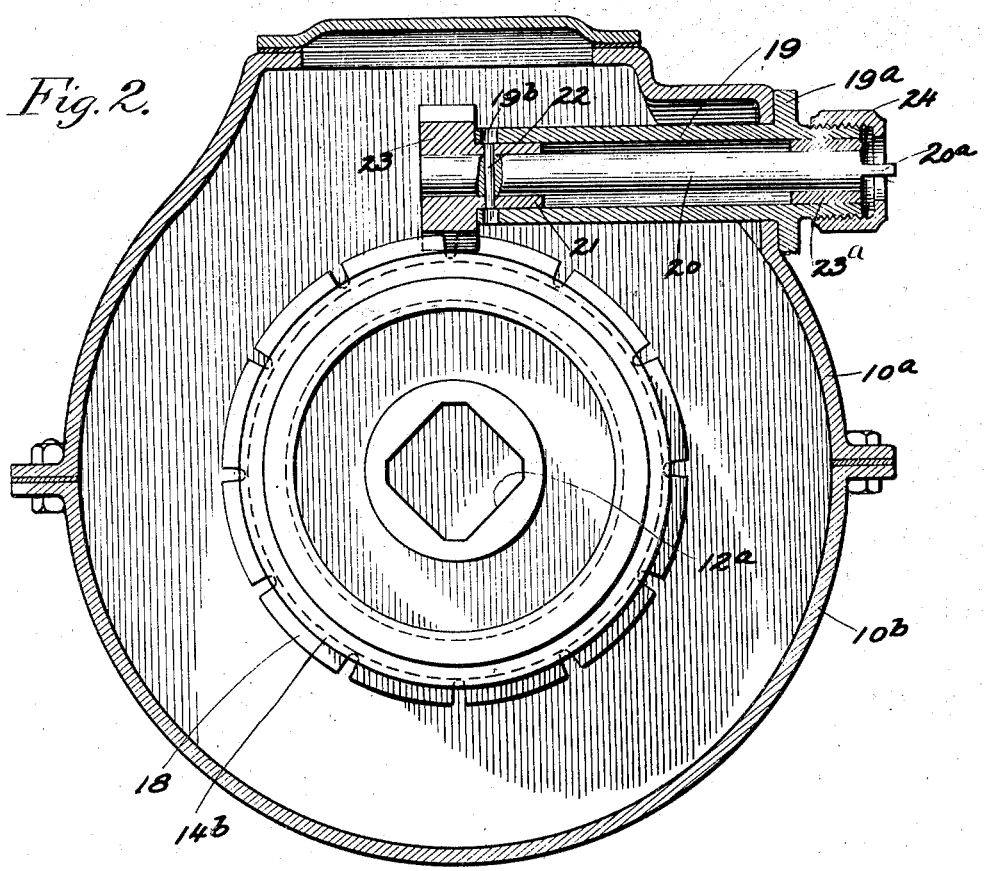
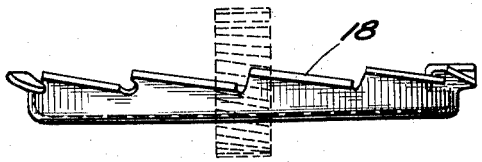
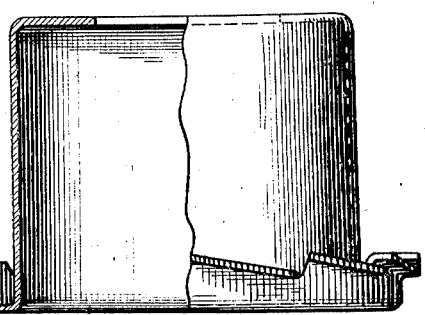
Witness:
C. C. Burnap
Inventor:
Theodore C. Prouty
By Sheridan, Sheridan & Smith, Attys

UNITED STATES PATENT OFFICE.

THEODORE C. PROUTY, OF ELGIN, ILLINOIS, ASSIGNOR, BY MESNE ASSIGNMENTS, TO VAN SICKLEN SPEEDOMETER COMPANY, OF WILMINGTON, DELAWARE, A CORPORATION OF DELAWARE.

DRIVING MECHANISM.

1,334,713.  Specification of Letters Patent.  Patented Mar. 23, 1920.

Original application filed March 28, 1914, Serial No. 827,910. Divided and this application filed February 16, 1918. Serial No. 217,477.

*To all whom it may concern:*

Be it known that I, THEODORE C. PROUTY, a citizen of the United States, residing at Elgin, in the county of Kane and State of Illinois, have invented certain new and useful Improvements in Driving Mechanism, of which the following is a specification.

This invention relates to improvements in driving mechanism, and has for its object to provide a new and improved combination of elements for driving speedometers, or other indicating devices, directly from the drive shaft of a vehicle.

The subject matter of this application is a division of Patent No. 1,260,447, issued to me March 26, 1918.

My invention also consists in the location of an actuatable member and gear driven thereby in the transmission casing of the vehicle, where it is protected from dirt, dust, or the like, and is constantly lubricated by the transmission lubrication.

These and other objects will be set forth and explained in the following specification and shown in the accompanying drawings, in which—

Fig. 2 is a transverse section through the casing showing the driving mechanism for a speedometer;

Fig. 3 is a plan view of my improved actuating member; and

Fig. 4 is a plan view partially in section of a modified form, showing the driving member formed integral with the clutch spring sleeve.

Figure 1:
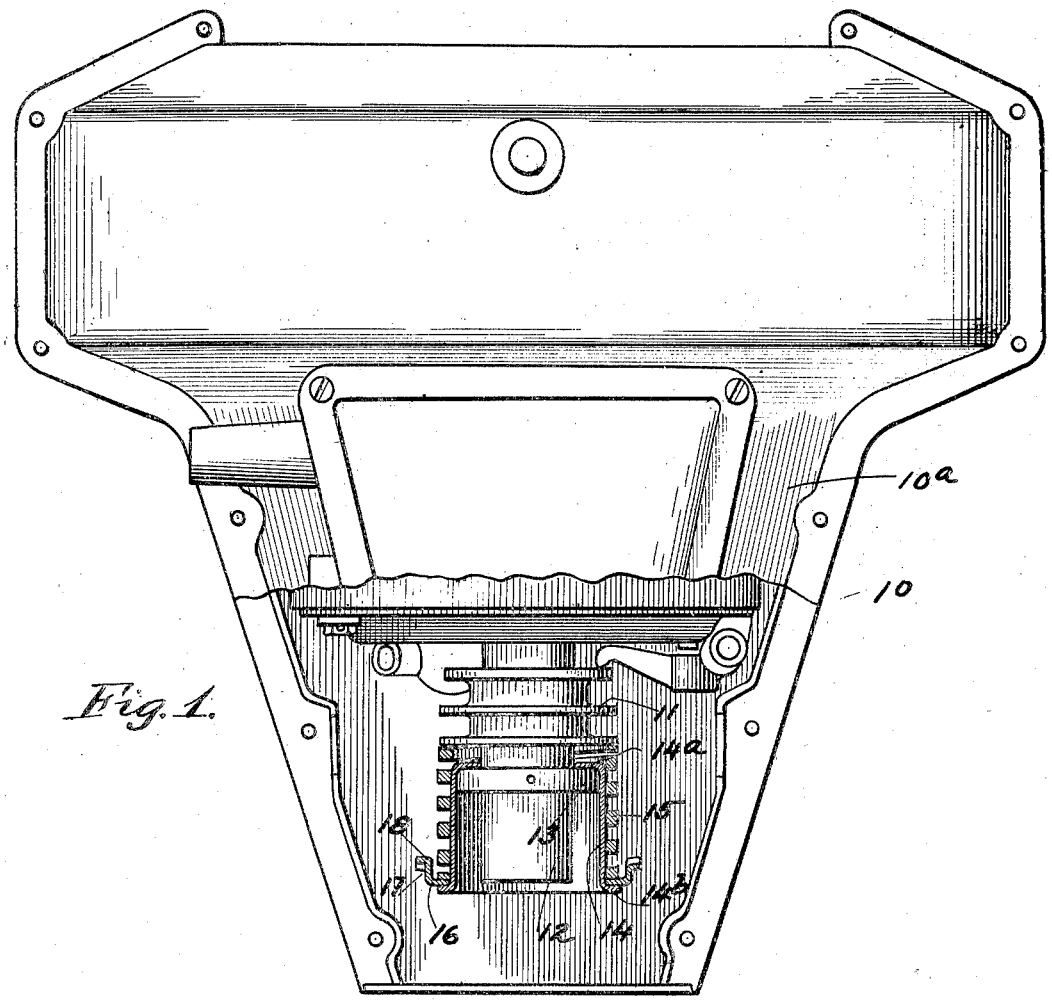
Figure 1 is a plan view of the transmission casing, part of which is broken away to show my actuatable member in place.

Like numerals refer to like elements throughout the drawings, in which 10 designates generally the transmission casing having a top portion 10ª and a lower portion 10ᵇ, said portions being preferably secured together by bolts or the like. Located in this transmission casing is the driving mechanism of a vehicle, which need not be described at length as it is well known to those familiar with the art. This driving mechanism comprises, among other elements, a sliding collar slidably mounted upon the driving shaft 12 of a vehicle. A collar 13 is fixed to the driving shaft 12 to rotate therewith, and mounted upon this collar is an inturned flange 14ª carried by the spring sleeve 14, which is also provided with a spring flange 14ᵇ. A clutch spring 15 extends between the rear face of the collar 11 and the flange 14ᵇ and is coiled around the sleeve 14, as is clearly shown in Fig. 1.

The general operation of the mechanism is well known, and it need only be mentioned that when the collar 11 is moved rearwardly on the driving shaft 12 the latter is not driven by the engine shaft and transmission. When the collar 11 is released, the spring 15 will actuate the same to operate suitable clutch mechanism to operatively connect the driving shaft 12 to the engine shaft to rotate therewith. The spring sleeve is constructed and arranged to rotate with the driving shaft 12, and consequently in accord with the rear wheels of a vehicle where rear wheel drive is used, as is generally the case, so that, by arranging my speedometer driving mechanism to coact with this driving shaft 12, rotations of the rear wheels may be suitably indicated, either as to speed or number, or both as desired. For this purpose, in the embodiment of my invention shown in Fig. 1, I provide what I term an actuatable member 16, interposed between the spring 15 and the flange 14ᵇ to rotate with the latter. The actuatable member 16 comprises, in effect, a shell, and is formed with an angularly disposed flange 17 from which, in the form shown, project outwardly segments or teeth 18. Projecting through the casing 10ª is the sleeve 19, having a flange 19ª adapted to be secured to the casing in any suitable manner. Rotatably mounted in the sleeve 19 is the shaft 20, provided with a bushing 21 at one end thereof secured to said shaft by the pin 22. This bushing carries a gear 23 located outwardly of the sleeve 19, as shown in Fig. 2. At the other end of the sleeve 19 is provided the bushing 23ª, there being a space in the sleeve 19 between the bushings 21 and 23ª. At the end of the shaft 20, opposite to that at which is located the gear 23, is provided a male engaging member 20ª adapted to coact with the female or socket member of a flexible shaft, not shown, these male and female members being held in engagement by a flanged collar 24 threaded on the projecting end of the sleeve 19 in any well known manner.

The sleeve 19 is provided with apertures 19ᵇ arranged to aline with pin 22 when it is desired to remove the same, and also providing access for lubricant to pass from the casing 10 into the interior of the sleeve 19. The sleeve 19 extends inwardly of the casing 10, as shown in Fig. 2, to position wherein the gear 23 will mesh with the tooth segments 18 of the actuating member, as shown in Fig. 3, for example.

The end of the shaft 12 is provided with a non-circular socket 12ᵃ in the embodiment shown for engagement by the non-circular end of the drive shaft extending between the shaft 12 and the differential, not shown. It will be understood that this is only one form of coupling means, namely, that used with the specific embodiment illustrated; and to substitute for the coupling portion 12ᵃ of the shaft shown any other well known form of shaft coupling means is within the contemplation of my invention.

In Fig. 4 is shown a modification in which members 14 and 16 of the construction shown in Fig. 1 are constructed integral, as will be obvious.

While the transmission casing, etc., shown in the accompanying drawings is of the Ford type, it will be obvious that by changes in the application, capable of being made by any mechanic, my invention may be applied to any form of vehicle drive, and I do not wish to be restricted to the use of my invention with that particular form of vehicle. Furthermore, I do not wish to be restricted to the form shown in the drawings and described in the specification save as defined in the appended claims.

What I claim is:

1. The combination with the power transmitting shaft of an automobile transmission and casing therefor, of an actuating member mounted to rotate with said shaft, a sleeve projecting through said casing, a shaft rotatably journaled in said sleeve, and a gear carried by said shaft and adapted to be actuated by said actuating member, said sleeve being apertured inside said casing to permit flow of lubricant around said shaft and said sleeve.

2. The combination with a casing having the power transmitting shaft of an automobile extending therethrough, of an actuating member mounted to rotate with said shaft, a sleeve projecting through said casing, a second shaft rotatably journaled in said sleeve, and a gear carried by said second shaft and adapted to be actuated by said actuating member.

3. In combination with a power transmitting shaft, means to journal said shaft, the latter being constructed and arranged at one end for engagement with a vehicle drive shaft, a gear attached to said shaft adjacent said end, a housing for said gear and shaft, said housing being provided with a lateral entrance, a bearing sleeve intruded through said entrance and made fast therein, a shaft journaled in said sleeve bearing, and a gear on the inner end of said shaft meshing with the gear in said housing.

4. The combination with the power transmitting shaft of an automobile, said shaft being provided with coupling means at one end thereof, of a gear carried by said shaft adjacent said coupling means, a housing for said gear, a sleeve bearing extending through said housing and secured thereto, a second shaft journaled in said bearing sleeve, and a gear on the inner end of said second shaft meshing with said first-named gear.

5. The combination with the power transmitting shaft of an automobile, of means associated therewith for operating a travel indicator, said means comprising a gear carried by said shaft, a housing for said gear, said housing having a lateral entrance leading into the housing cavity, a shaft journaled in said entrance, and a gear on the inner end of said shaft meshing with said first-named gear.

In testimony whereof I have subscribed my name.

THEODORE C. PROUTY.

Witnesses:
HUGH ERVIN,
LORETTA DEMPSEY.